(12) United States Patent
Park

(10) Patent No.: US 12,498,127 B2
(45) Date of Patent: Dec. 16, 2025

(54) FILTER ASSEMBLY FOR AIR CONDITIONER

(71) Applicant: Chulmin Park, Oakland Garden, NY (US)

(72) Inventor: Chulmin Park, Oakland Garden, NY (US)

( * ) Notice: Subject to any disclaimer, the term of this patent is extended or adjusted under 35 U.S.C. 154(b) by 445 days.

(21) Appl. No.: 17/593,102

(22) PCT Filed: Aug. 13, 2021

(86) PCT No.: PCT/US2021/045905
§ 371 (c)(1),
(2) Date: Sep. 9, 2021

(87) PCT Pub. No.: WO2022/046435
PCT Pub. Date: Mar. 3, 2022

(65) Prior Publication Data
US 2023/0114861 A1 Apr. 13, 2023

Related U.S. Application Data

(60) Provisional application No. 63/069,562, filed on Aug. 24, 2020.

(51) Int. Cl.
*F24F 8/108* (2021.01)
*B01D 46/00* (2022.01)
*F24F 13/28* (2006.01)

(52) U.S. Cl.
CPC .......... *F24F 8/108* (2021.01); *B01D 46/0005* (2013.01); *F24F 13/28* (2013.01); *B01D 2275/203* (2013.01)

(58) Field of Classification Search
CPC .......... B01D 2275/203; B01D 46/0016; B01D 46/023; B01D 46/0005; F24F 8/108; F24F 13/28
(Continued)

(56) References Cited

U.S. PATENT DOCUMENTS 5,364,458 A * 11/1994 Burnett ................... B03C 3/155
96/68
5,476,526 A 12/1995 Attermeyer
(Continued)

OTHER PUBLICATIONS

International preliminary report on patentability issued in PCT/US2021/045905, issued on Feb. 28, 2023.
(Continued)

*Primary Examiner* — Jennifer Dieterle
*Assistant Examiner* — Qianping He
(74) *Attorney, Agent, or Firm* — ICE MILLER LLP

(57) ABSTRACT

The present disclosure relates to A filter assembly for an air conditioner including: a frame including a plurality of main members forming a plurality of sides and a plurality of corner members connecting a pair of main members by variably adjusting an interval between the pair of main members adjacent to each other, forming an air flow port through which air passes, and being detachably installed at an intake port or an exhaust port of a duct connected to the air conditioner; a detachable unit for detaching the plurality of main members and the plurality of corner members; and an air conditioner filter forming a plurality of filtering holes and being stretchably provided in the frame, including a unit cross-sectional area of the plurality of filtering holes that are variable depending on variable adjustment of the frame, and filtering air passing through the air flow port.

13 Claims, 10 Drawing Sheets

(58) Field of Classification Search
USPC .......................................................... 55/490
See application file for complete search history.

(56) References Cited

U.S. PATENT DOCUMENTS

| | | | |
|---|---|---|---|
| 5,837,022 A | | 11/1998 | Chapman |
| 5,968,217 A | * | 10/1999 | Stein ..................... B01D 46/10 |
| | | | 55/DIG. 35 |
| 6,007,596 A | | 12/1999 | Rosen |
| 10,512,872 B2 | | 12/2019 | Williams et al. |
| 2001/0032485 A1 | * | 10/2001 | Wu ..................... B60R 25/0225 |
| | | | 70/209 |
| 2005/0035573 A1 | * | 2/2005 | Petrishe .................. B62H 7/00 |
| | | | 280/288.4 |
| 2016/0271598 A1 | * | 9/2016 | Mukai .................... D03D 15/47 |
| 2017/0348624 A1 | * | 12/2017 | Do ..................... B01D 46/0005 |

OTHER PUBLICATIONS

Filterwears, Filterwears F154L Universal Water Repellent Cold Air Intake Pre-Filter—Large. May 10, 2017 (May 10, 2017).
International Search Report and Written Opinion issued in PCT/US2021/045905, mailed Nov. 26, 2021.

\* cited by examiner

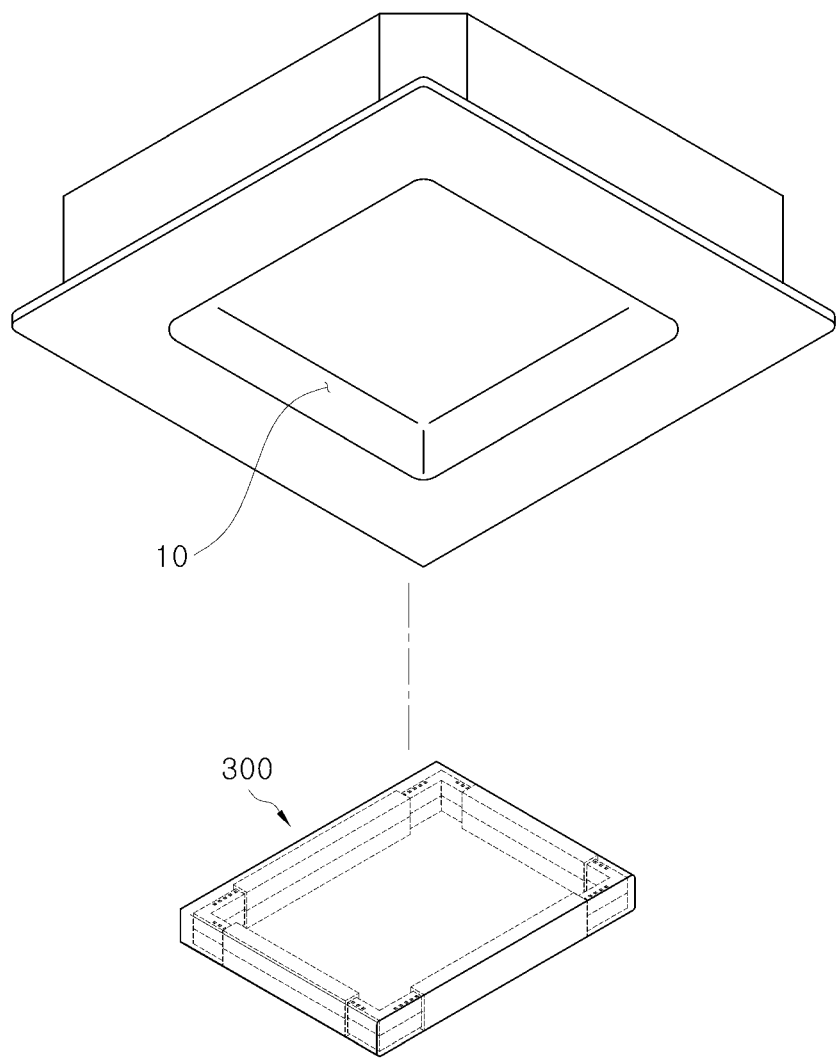
[FIG. 1]

[FIG. 2]
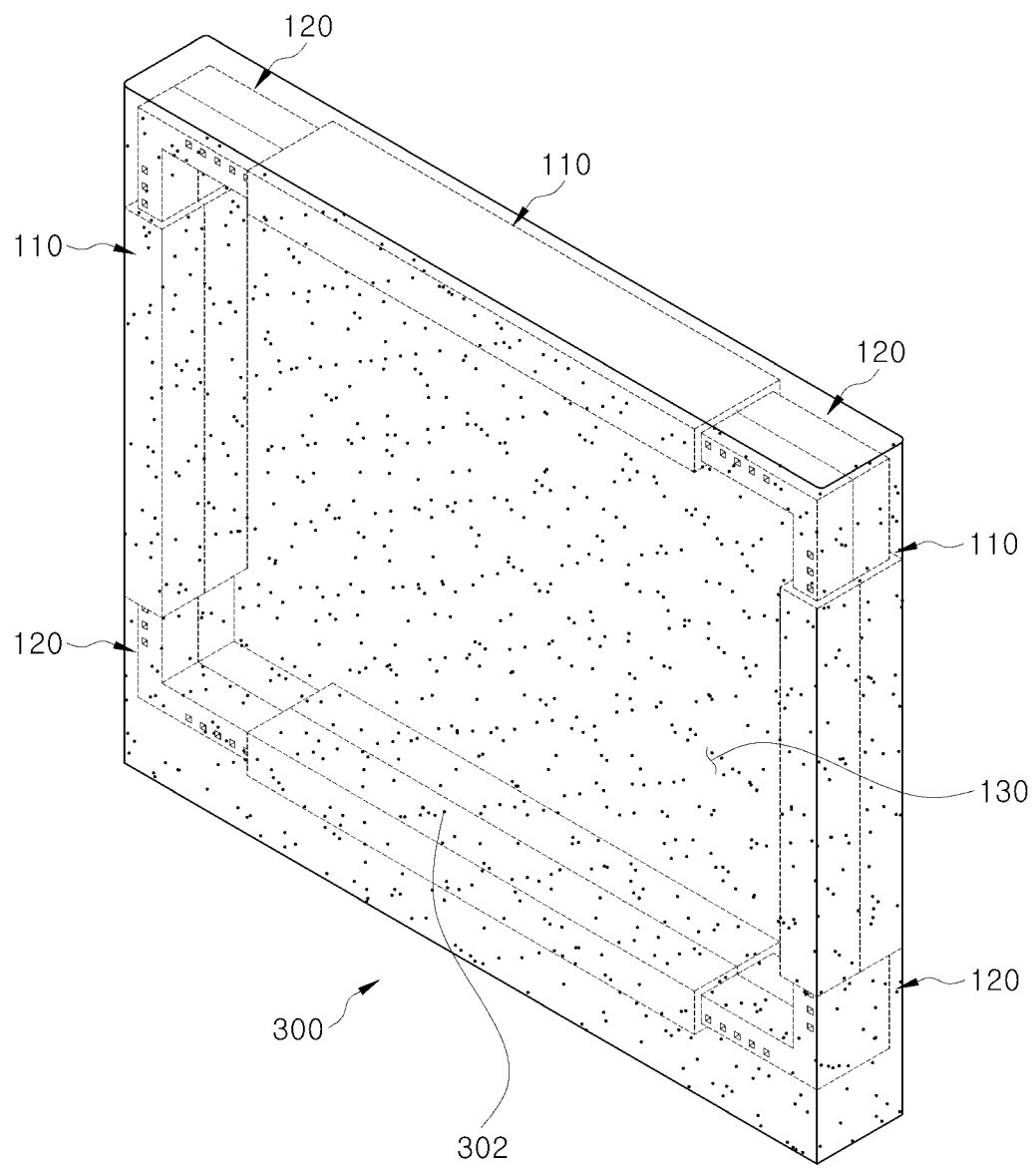

[FIG. 3]
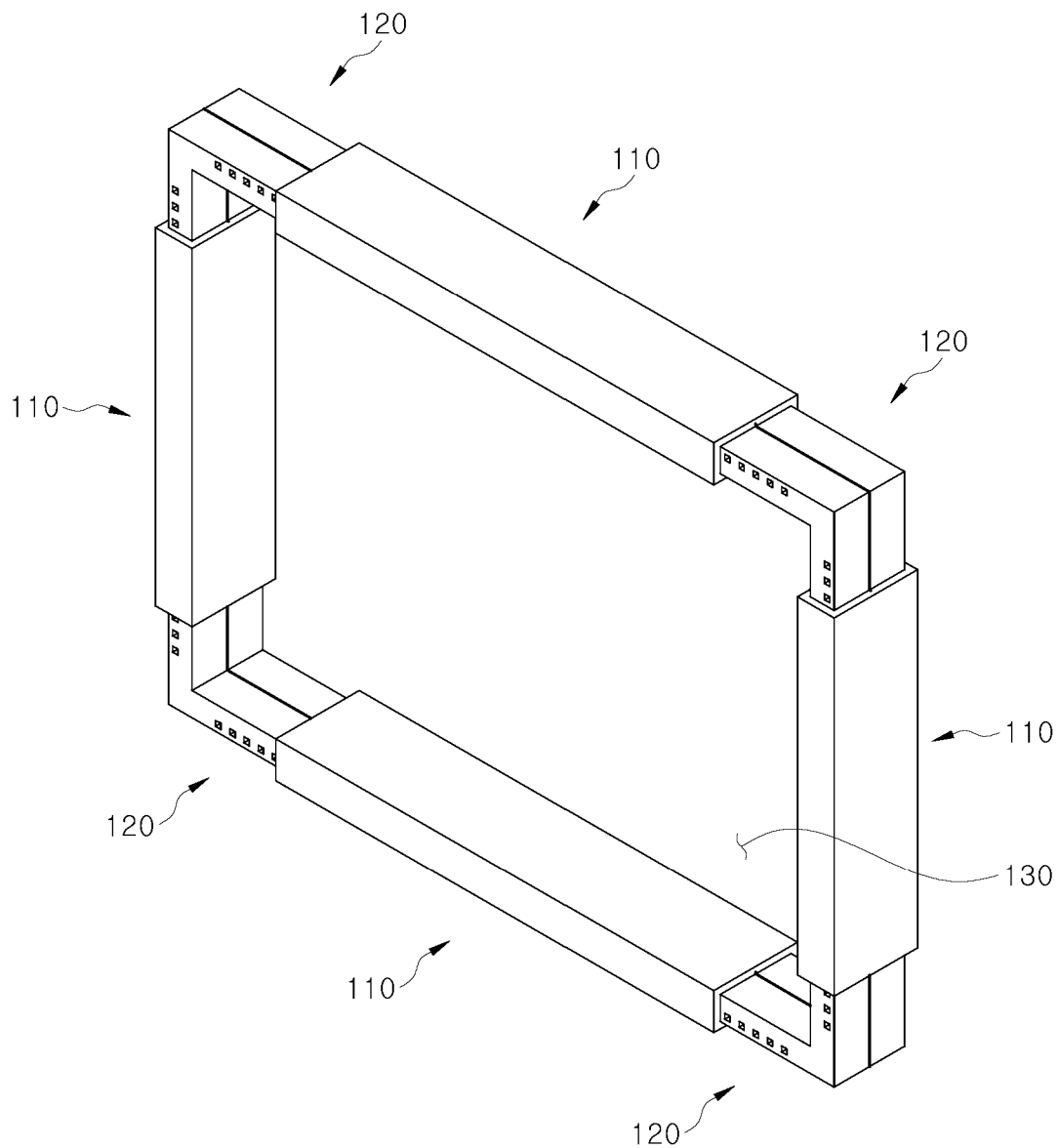

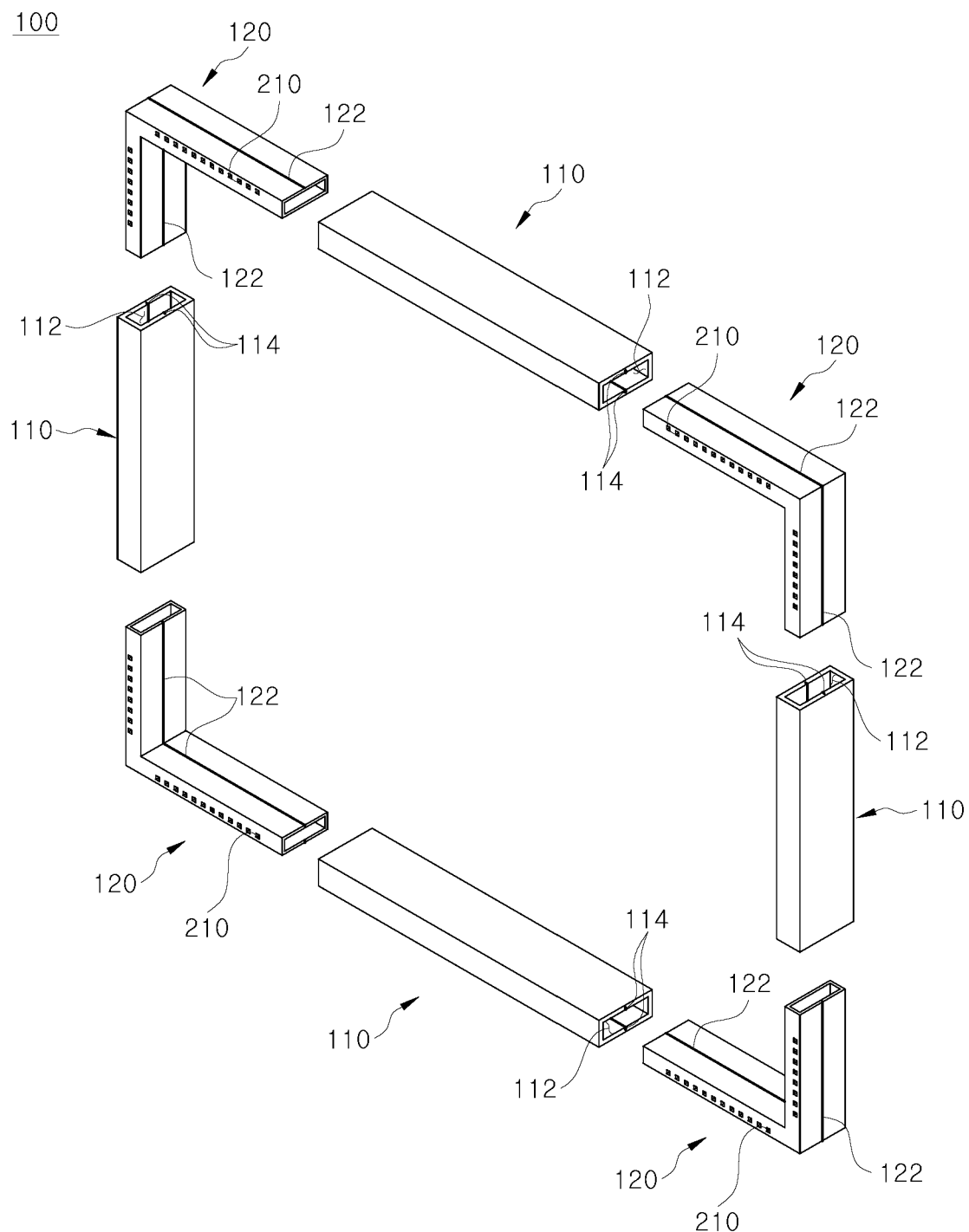
[FIG. 4]

[FIG. 5]
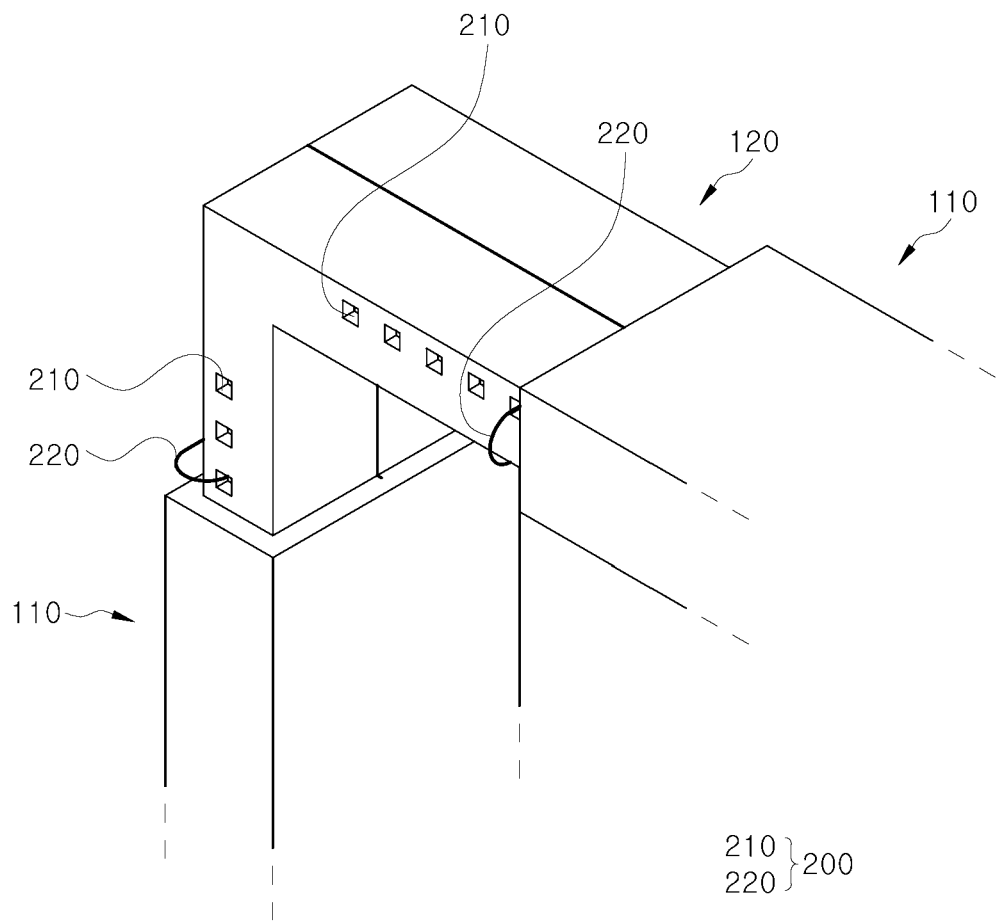

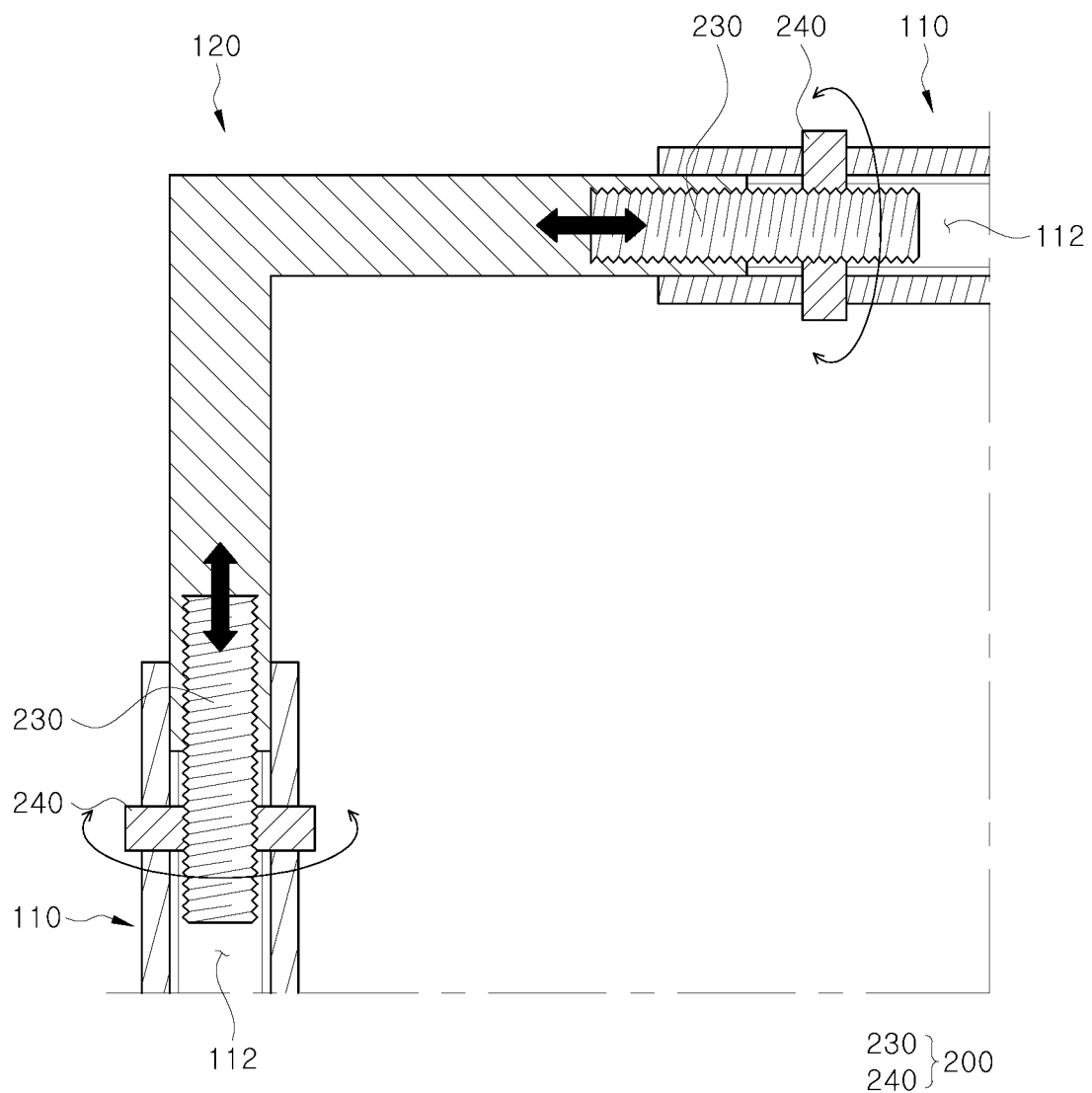
[FIG. 6]

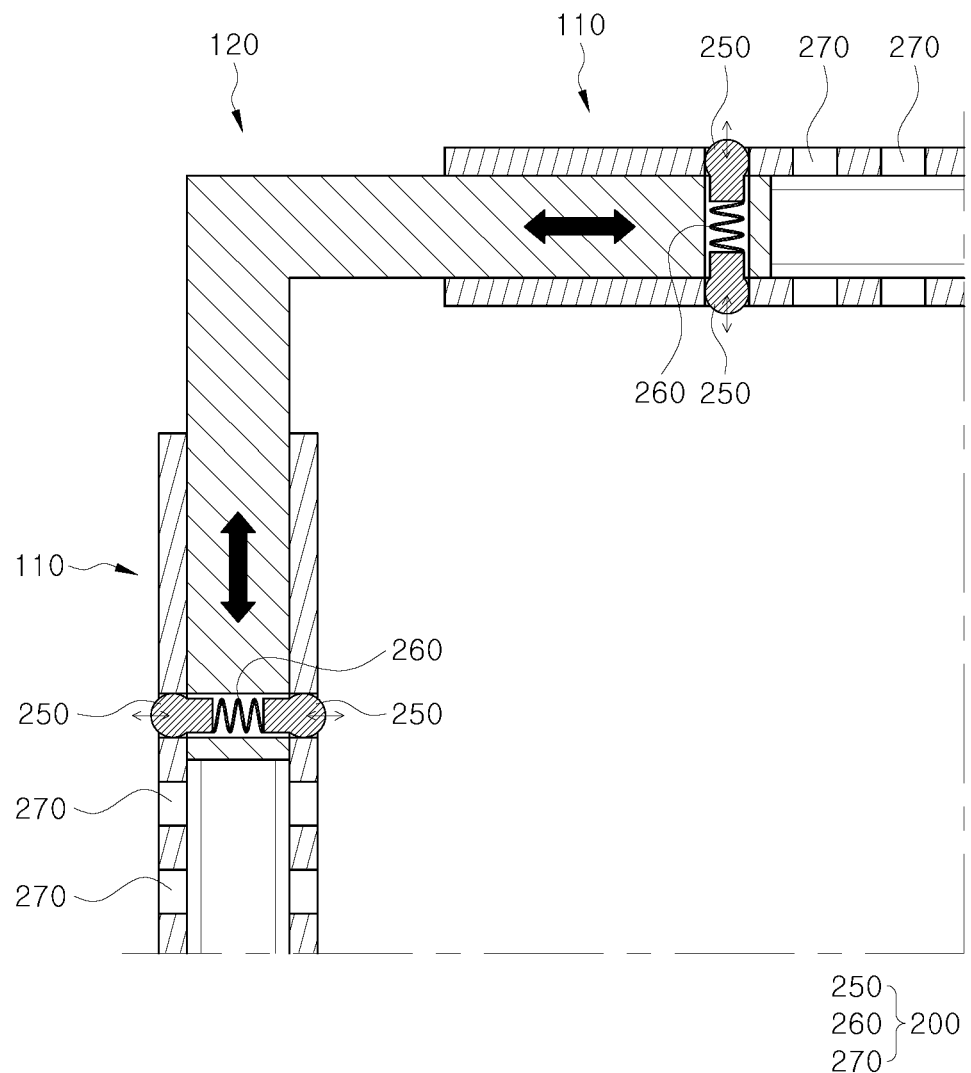
[FIG. 7]

[FIG. 8]
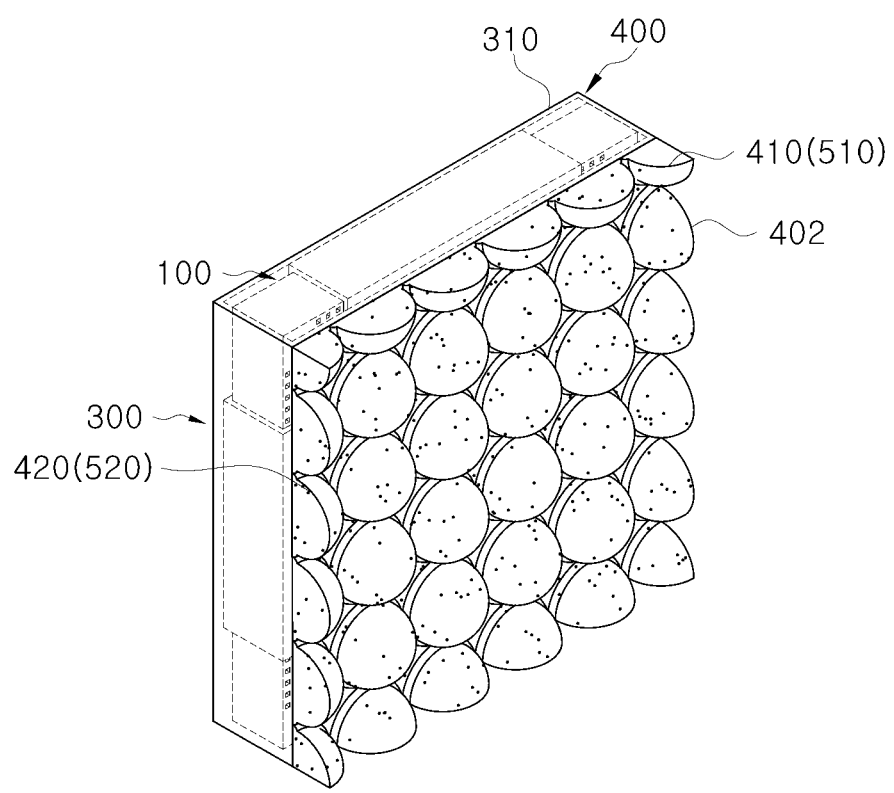

[FIG. 9]
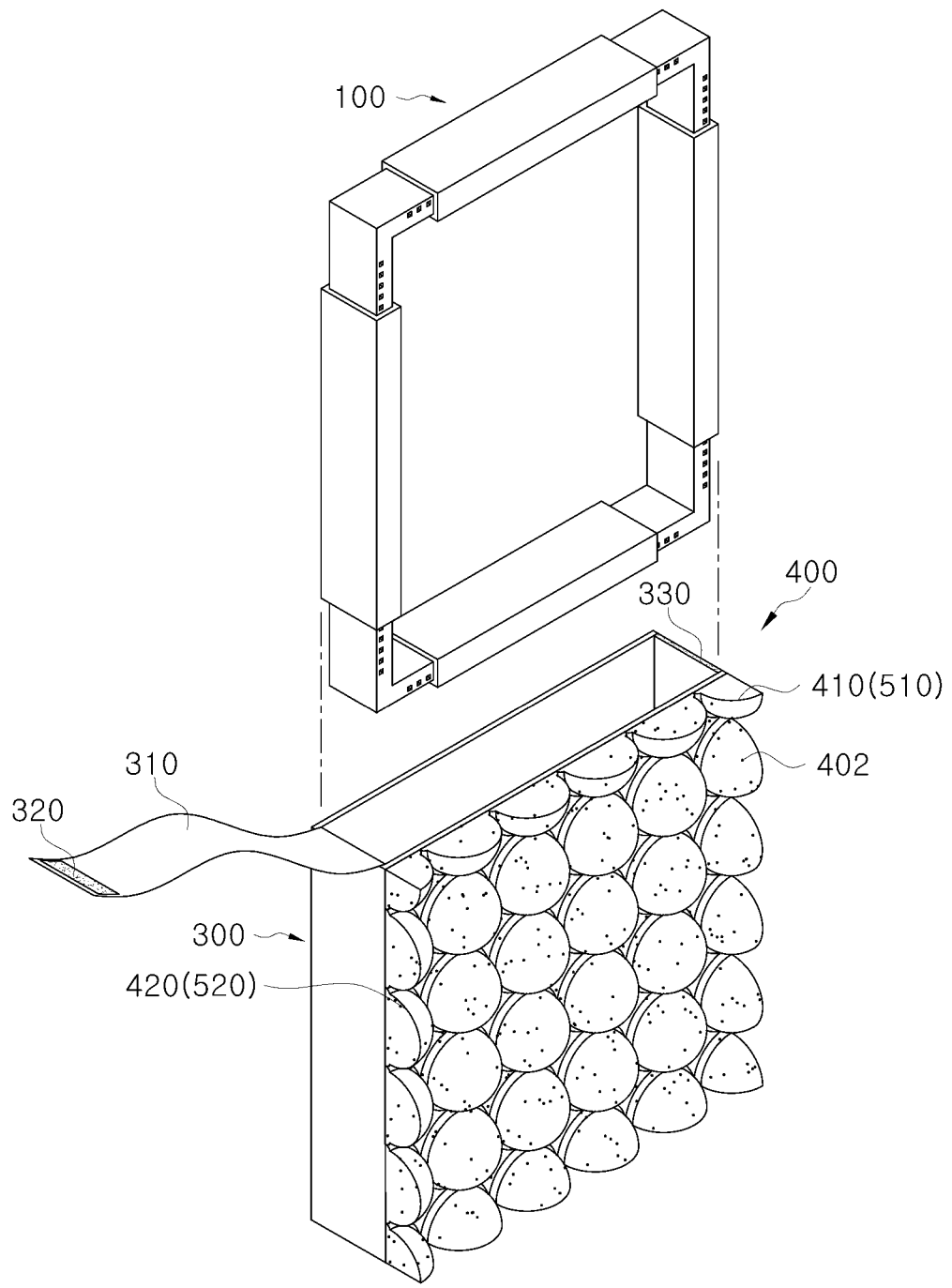

[FIG. 10]
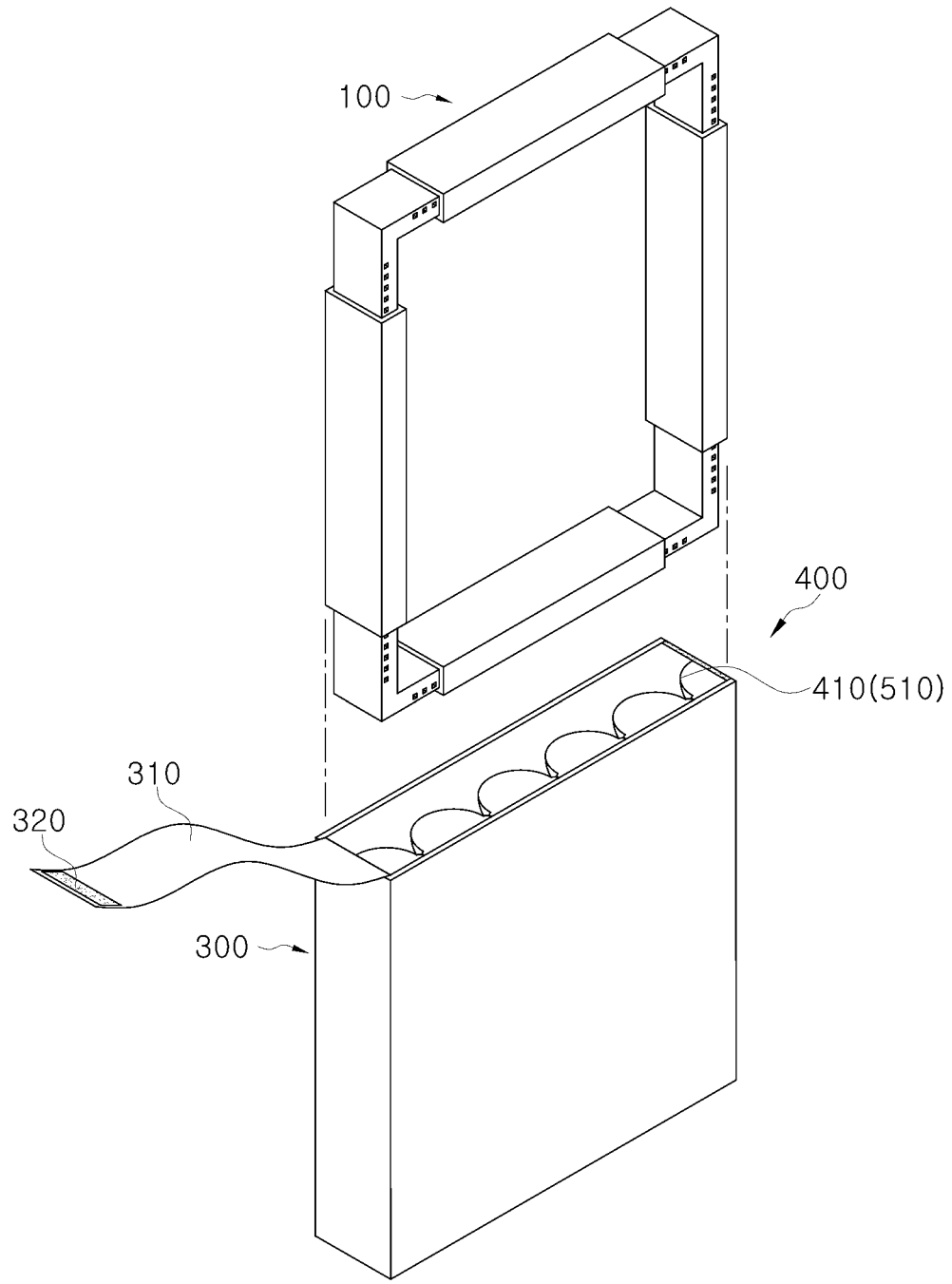

FILTER ASSEMBLY FOR AIR CONDITIONER

TECHNICAL FIELD

The present disclosure relates to a filter assembly for an air conditioner, for fixing an air conditioner filter, provided at an intake port or an exhaust port of a duct connected to the air conditioner.

BACKGROUND ART

In general, an air conditioner cools and discharges air introduced from the outside, and serves to maintain a pleasant ambient temperature.

Since the air introduced into the air conditioner may contain various foreign substances such as dust, the foreign substances contained in the air introduced into the air conditioner are filtered through an air conditioner filter and the filtered air is then cooled. Such an air conditioner filter is fixed to a filter assembly for an air conditioner provided in the air conditioner.

In particular, in an air conditioning system in which an air conditioner filter is provided at an intake port or an exhaust port of a duct connected to the air conditioner, the air conditioner filter for filtering air flowing through the intake port or exhaust port is mounted in the intake port or the exhaust port with a frame.

However, the conventional filter assembly for an air conditioner has a fixed overall size, so only a conventional filter assembly corresponding to the size of the intake or exhaust port can be installed. There is a restriction on the use of fixing devices for air conditioner filters.

In addition, in order to replace an air conditioner filter, a user has to purchase and install a plurality of fixing devices for the air conditioner filter according to the size of the intake port or exhaust port. Hence, economic loss may be large and maintenance costs may also be increased.

DISCLOSURE OF INVENTION

Technical Problem

An aspect of the present disclosure is directed to providing a filter assembly for an air conditioner which is able to be variably adjusted in size in response to various sizes of an intake port or an exhaust port of a duct connected to an air conditioner and which can be used for general purpose.

The aspects of the present disclosure are not limited to those mentioned above, and other aspects not mentioned herein will be clearly understood by those skilled in the art from the following description.

Solution to Problem

A filter assembly for an air conditioner according to an embodiment of the present disclosure includes: a frame including a plurality of main members forming a plurality of sides and a plurality of corner members connecting a pair of main members by variably adjusting an interval between the pair of main members adjacent to each other, forming an air flow port through which air passes, and being detachably installed at an intake port or an exhaust port of a duct connected to the air conditioner; a detachable unit for detaching the plurality of main members and the plurality of corner members; and an air conditioner filter forming a plurality of filtering holes and being stretchably provided in the frame, including a unit cross-sectional area of the plurality of filtering holes that are variable depending on variable adjustment of the frame, and filtering air passing through the air flow port.

In addition, the detachable unit may include: a plurality of coupling holes formed through at least one of the plurality of main members and the plurality of corner members at intervals in a length direction; and a stopper selectively coupled to any one of the plurality of coupling holes to prevent the corner member from moving toward the main member and to variably adjust an interval between the main member and the corner member.

In addition, the detachable unit may include: a screw shaft coupled to the corner member; and a nut unit which is screwed with the screw shaft and provided to be rotatable on the main member, reciprocates the screw shaft with respect to the main member according to forward and reverse rotation, and variably adjusts an interval between the main member and the corner member.

In addition, the detachable unit may include: a ratchet protrusion provided to be drawn in and out from the corner member; a spring provided on the corner member to generate an elastic force on the ratchet protrusion so that the ratchet protrusion is drawn out from the corner member; and a plurality of ratchet grooves formed at intervals in a length direction of the main member, to which the ratchet protrusion is selectively coupled.

In addition, the filter assembly for an air conditioner may include an auxiliary air conditioner filter which is stretchably coupled to the air conditioner filter in response to variable adjustment of the frame between an minimum cross-sectional area of the air flow port and a maximum cross-sectional area of the air flow port, and forms a plurality of auxiliary filtering holes and filters air introduced into the air conditioner filter or discharged from the air conditioner filter.

In addition, the auxiliary air conditioner filter may have a continuous concavo-convex shape so as to be stretchable in longitudinal and transverse directions of the frame.

In addition, a plurality of elastic members that stretch depending on variation of the frame may be provided on the main portion of the auxiliary air conditioner filter.

In addition, the air conditioner filter may have a bag shape surrounding and accommodating the frame.

Other specific details of the present disclosure are included in the detailed description and drawings.

Advantageous Effects of Invention

The filter assembly for an air conditioner according to the present disclosure can be used for general purpose by variably adjusting the size in response to various sizes of an inlet port or an exhaust port of a duct connected to an air conditioner.

The advantages of the present disclosure are not limited to those mentioned above, and other advantages not mentioned herein will be clearly understood by those skilled in the art from the following description.

BRIEF DESCRIPTION OF DRAWINGS

FIG. 1 is a perspective view illustrating a state in which a filter assembly for an air conditioner according to an embodiment of the present disclosure is installed at an intake port or an exhaust port.

FIG. 2 is a perspective view illustrating a state in which the entire air conditioner filter is fixed to the filter assembly for an air conditioner according to an embodiment of the present disclosure.

FIG. 3 is a perspective view illustrating a filter assembly for an air conditioner according to an embodiment of the present disclosure.

FIG. 4 is an exploded perspective view illustrating a filter assembly for an air conditioner according to an embodiment of the present disclosure.

FIG. 5 is a perspective view illustrating an example of a detachable unit of a filter assembly for an air conditioner according to an embodiment of the present disclosure.

FIG. 6 is a cross-sectional view illustrating another example of a detachable unit of a filter assembly for an air conditioner according to an embodiment of the present disclosure.

FIG. 7 is a view illustrating another example of a detachable unit of a filter assembly for an air conditioner according to an embodiment of the present disclosure.

FIG. 8 is a perspective view illustrating an example of an air conditioner filter and an auxiliary air conditioner filter fixed to a frame of a filter assembly for an air conditioner according to an embodiment of the present disclosure.

FIG. 9 is an exploded perspective view illustrating an example of an air conditioner filter and an auxiliary air conditioner filter fixed to a frame of a filter assembly for an air conditioner according to an embodiment of the present disclosure.

FIG. 10 is an exploded perspective view illustrating another example of an air conditioner filter and an auxiliary air conditioner filter fixed to a frame of a filter assembly for an air conditioner according to an embodiment of the present disclosure.

DESCRIPTION OF EMBODIMENTS

The advantages and features of the present disclosure and methods of achieving them will be apparent from the embodiments that will be described in detail with reference to the accompanying drawings. It should be noted, however, that the present disclosure is not limited to the following embodiments, and may be implemented in various different forms. Rather the embodiments are provided so that this disclosure will be thorough and complete and will fully convey the scope of the present disclosure to those skilled in the technical field to which the present disclosure pertains. It is to be noted that the scope of the present disclosure is defined only by the claims.

Terms used in the specification are used to describe embodiments of the present disclosure and are not intended to limit the scope of the present disclosure. In the specification, the terms of a singular form may include plural forms unless otherwise specified. The expressions "comprise" and/or "comprising" used herein indicate existence of one or more other elements other than stated elements but do not exclude presence of additional elements. Like reference denotations refer to like elements throughout the specification. As used herein, the term "and/or" includes each and all combinations of one or more of the mentioned elements. It will be understood that, although the terms "first", "second", etc., may be used herein to describe various elements, these elements should not be limited by these terms. These terms are only used to distinguish one element from another element. Accordingly, a first element mentioned below could be termed a second element without departing from the technical ideas of the present disclosure.

Unless otherwise defined, all terms (including technical and scientific terms) used herein have the same meaning as commonly understood by those skilled in the technical field to which the present disclosure pertains. It will be further understood that terms, such as those defined in commonly used dictionaries, should not be interpreted in an idealized or overly formal sense unless expressly so defined herein.

Hereinafter, the embodiments of the present disclosure will be described in detail with reference to the accompanying drawings.

FIG. 1 is a perspective view illustrating a state in which a filter assembly for an air conditioner according to an embodiment of the present disclosure is installed at an intake port or an exhaust port. FIG. 2 is a perspective view illustrating a state in which the entire air conditioner filter is fixed to the filter assembly for an air conditioner according to an embodiment of the present disclosure. FIG. 3 is a perspective view illustrating a filter assembly for an air conditioner according to an embodiment of the present disclosure. FIG. 4 is an exploded perspective view illustrating a filter assembly for an air conditioner according to an embodiment of the present disclosure.

As illustrated in FIGS. 1 to 4, the filter assembly for an air conditioner according to an embodiment of the present disclosure includes a frame 100, a detachable unit 200, and an air conditioner filter 300.

The frame 100 is adjustable in size according to the size of an intake port 10 or an exhaust port 10 of a duct connected to an air conditioner, and is detachably installed at the intake port 10 or the exhaust port 10, and serves to fix the air conditioner filter 300 to the intake port 10 or the exhaust port 10. The intake port 10 or the exhaust port 10 may be a passage through which air sucked into the air conditioner passes.

The air conditioner filter 300 may have a bag shape. A filter cover 310 covering the bag-shaped opening may be provided in the air conditioner filter 300. The bag-shaped opening of the air conditioner filter 300 and the filter cover 310 may be detached through a pair of hook and loop fastner 320 and 330. (See FIG. 9)

In addition, the filter cover 310 may be separated into a pair, and the pair of filter covers 310 may extend from both sides of the bag-shaped opening, respectively. A pair of Velcros 320 and 330 is provided at the distal end of the pair of filter covers 310, respectively, and may be detached through the pair of Velcros 320, 330.

The frame 100 includes a plurality of main members 110 and a plurality of corner members 120.

The plurality of main members 110 and the plurality of corner members 120 may be interconnected to form a closed loop, and may form an air flow port 130 through which air passes through the closed loop shaped interior.

In addition, the main member 110 may have a bar shape, and the corner member 120 may have a pair of bars vertically connected to each other.

The plurality of main members 110 form a plurality of sides and serve to support the air conditioner filter 300. For example, the plurality of main members 110 may include a pair of main members 110 disposed at intervals in the longitudinal direction and another pair of main members 110 disposed at intervals in the lateral direction. In other words, the plurality of main members 110 may be arranged along each side of the rectangle.

For example, the main member 110 may be formed with an insertion unit 112 that penetrates in the length direction of the main member 110 and the corner member 120 may be inserted into the insertion unit 112.

As another example, a guide track 114 may be formed on the inner surface of the insertion unit 112 in the length direction of the main member 110, and a guide groove 122 moving along the guide track 114 on the outer surface of the corner member 120 may be formed. The guide track 114 and the guide groove 122 may be formed in a bar shape. In addition, the guide track 114 may be formed on both sides of the inner surface of the insertion unit 112, and the guide groove 122 may be formed on both sides of the outer surface of the corner member 120.

The plurality of corner members 120 connect the pair of main members 110 by variably adjusting an interval between the pair of main members 110 adjacent to each other. When an interval between the pair of main members 110 adjacent to each other is variably adjusted through the plurality of corner members 120 in this way, the sizes in longitudinal and lateral directions of the frame 100 may be variably adjusted.

The detachable unit 200 serves to detach the main member 110 and the corner member 120. Various examples of the detachable unit 200 will be described.

FIG. 5 is a perspective view illustrating an example of the detachable unit 200 of a filter assembly for an air conditioner according to an embodiment of the present disclosure.

As illustrated in FIG. 5, for example, the detachable unit 200 may include a plurality of coupling holes 210 and a stopper 220.

The plurality of coupling holes 210 may be formed through the plurality of corner members 120 at intervals in the length direction. Scales (not shown) may be sequentially displayed on the plurality of corner members 120 in the length direction. Accordingly, the length by which the corner member 120 is inserted into the insertion unit 112 may be checked to a user through the scale displayed on the corner member 120.

The stopper 220 is selectively coupled to any one of the plurality of coupling holes 210 to prevent the corner member 120 from moving toward the main member 110, and the interval between the main member 110 and the corner member 120 may be variably adjusted.

In other words, the stopper 220 is selectively coupled to any one of the plurality of coupling holes 210. When the corner member 120 is inserted into the insertion unit 112 of the main member 110, it may be possible to prevent the corner member 120 from being additionally inserted into the insertion unit 112 of the main member 110 by being caught at the distal end of the main member 110, and the interval between the main member 110 and the corner member 120 can be variably adjusted. In other words, the stopper 220 may serve to limit the length by which the corner member 120 is inserted into the insertion unit 112 of the main member 110. The stopper 220 includes a flexible material. After the stopper 220 is penetrated through the coupling hole 210, both ends of the stopper 220 are bent toward the coupling hole 210, so when the corner member 120 is inserted into the insertion unit 112 of the main member 110, the stopper 220 may be caught at the distal end of the main member 110.

In this example, the detachable unit 200 may detach the main member 110 and the corner member 120 in a way such that after the corner member 120 is inserted into the insertion unit 112 of the main member 110, the stopper 220 coupled to any one of the plurality of coupling holes 210 prevents further insertion of the corner member 120.

FIG. 6 is a cross-sectional view illustrating another example of the detachable unit 200 of a filter assembly for an air conditioner according to an embodiment of the present disclosure.

As illustrated in FIG. 6, as another example, the detachable unit 200 may include a screw shaft 230 and a nut unit 240.

The screw shaft 230 is coupled to the corner member 120. The screw shaft 230 may be screw-coupled to the nut unit 240 to be described later.

The nut unit 240 is screw-coupled to the screw shaft 230 and provided to be rotatable on the main member 110, and the screw shaft 230 is reciprocally moved relative to the main member 110 according to the forward and reverse rotation and the interval between the main member 110 and the corner member 120 may be variably adjusted. Specifically, the nut unit 240 may be provided rotatably on the insertion unit 112 of the main member 110, and the screw shaft 230 may be inserted into the insertion unit 112 to be screw-coupled to the nut unit 240.

Accordingly, when the nut unit 240 is rotated forward, the nut unit 240 may move in a direction in which the screw shaft 230 and the corner member 120 are inserted into the insertion unit 112 of the main member 110. When the nut unit 240 is rotated in reverse, the nut unit 240 may move in a direction in which the screw shaft 230 and the corner member 120 are discharged from the insertion unit 112 of the main member 110.

In this example, the detachable unit 200 may detach the main member 110 and the corner member 120 in a way such that the screw shaft 230 coupled to the corner member 120 is screw-coupled to the nut unit 240 provided rotatably to the main member 110.

FIG. 7 is a view illustrating another example of the detachable unit 200 of a filter assembly for an air conditioner according to an embodiment of the present disclosure.

As illustrated in FIG. 7, as another example, the detachable unit 200 may include a ratchet protrusion 250, a spring 260 and a plurality of ratchet grooves 270.

The ratchet protrusion 250 may be provided in the corner member 120 so as to be able to be drawn in and out.

The corner member 120 may be formed with a draw-in and out hole 124 through which the ratchet protrusion 250 is drawn in and out. The draw-in and out hole 124 may be formed in a direction perpendicular to the length direction of the corner member 120, the ratchet protrusion 250 may be configured as a pair, and the pair of ratchet protrusions 250 may be provided on both sides of the draw-in and out hole 124 to be drawn in and out, respectively.

The spring 260 may be provided on the corner member 120 to generate an elastic force on the ratchet protrusion 250 so that the ratchet protrusion 250 is drawn out from the corner member 120. Specifically, the spring 260 is interposed between a pair of ratchet protrusions 250 provided on both sides of the draw-in and out hole 124, respectively, to generate an elastic force so that the pair of ratchet protrusions 250 is drawn out from the corner member 120.

A plurality of ratchet grooves 270 are formed at intervals in the length direction of the main member 110, so that the ratchet protrusion 250 may be selectively coupled thereto.

In this example, the detachable unit 200 may detach the main member 110 and the corner member 120 in a way such that after the corner member 120 is inserted into the insertion unit 112 of the main member 110, the ratchet protrusion 250 is selectively coupled to the plurality of ratchet grooves 270.

When the corner member 120 is additionally inserted into or discharged from the insertion unit 112 of the main member 110, the ratchet protrusion 250 is drawn in by pressing the ratchet protrusion 250 coupled to the ratchet groove 270. Then, the corner member 120 may be moved in the direction of being further inserted or discharged from the insertion unit 112 of the main member 110, and the corner member 120 may be further inserted into or discharged from the insertion unit 112 of the main member 110

The air conditioner filter 300 forms a plurality of filtering holes 302 and is stretchably provided in the frame 100, and includes a unit cross-sectional area of the plurality of filtering holes 302 that are variable depending on variable adjustment of the frame 100, and filters air passing through the air flow port 130.

FIG. 8 is a perspective view illustrating an example of the air conditioner filter 300 and an auxiliary air conditioner filter 400 fixed to the 100 frame of a filter assembly for an air conditioner according to an embodiment of the present disclosure. FIG. 9 is an exploded perspective view illustrating an example of the air conditioner filter 300 and the auxiliary air conditioner filter 400 fixed to the frame 100 of a filter assembly for an air conditioner according to an embodiment of the present disclosure.

As illustrated in FIGS. 8 and 9, the air conditioner filter 300 may have a bag shape to surround and accommodate the frame 100.

The air conditioner filter 300 may include a stretchable material, for example, spandex. Accordingly, the air conditioner filter 300 may be stretchable to a size corresponding to the size of the frame 100.

In addition, a filter assembly for an air conditioner according to an embodiment of the present disclosure may include the auxiliary air conditioner filter 400. The circumference of the auxiliary air conditioner filter 400 may be coupled to the outer surface of the air conditioner filter 300.

The auxiliary air conditioner filter 400 is stretchably coupled to the air conditioner filter 300 in response to variable adjustment of the frame 100 between a minimum cross-sectional area of the air flow port 130 and a maximum cross-sectional area of the air flow port 130, and forms a plurality of auxiliary filtering holes 402 and filters air introduced into the air conditioner filter 300 or discharged from the air conditioner filter 300.

The auxiliary air conditioner filter 400 may have a continuous concavo-convex shape so as to be stretchable in longitudinal and transverse directions of the frame 100. Specifically, the auxiliary air conditioner filter 400 may be provided with a wavy first wave line 410 in the longitudinal direction of the frame 100, and may be provided with a wavy second wave line 410 in the lateral direction of the frame 100.

A plurality of elastic members 510 and 520 that stretch according to variation of the frame 100 may be provided in the main portion of the auxiliary air conditioner filter 400. Specifically, the plurality of elastic members 510 and 520 include a first elastic member 510 coupled to the first wave line 410 and a second elastic member 520 coupled along the second wave line 420. The plurality of first elastic members 510 may be alternately coupled to the second elastic member 520, and the plurality of second elastic members 520 may be alternately coupled to the first elastic member 510.

As illustrated in FIGS. 8 to 9, the auxiliary air conditioner filter 400 may be coupled to the outer surface of the air conditioner filter 300.

FIG. 10 is an exploded perspective view illustrating another example of an air conditioner filter and an auxiliary air conditioner filter fixed to a frame of a filter assembly for an air conditioner according to an embodiment of the present disclosure.

As illustrated in FIG. 10, the auxiliary air conditioner filter 400 may be coupled to the inner surface of the air conditioner filter 300.

Hereinafter, a process of installing the filter assembly for an air conditioner according to an embodiment of the present disclosure to the intake port 10 or the exhaust port 10 of a duct connected to the air conditioner will be described.

First, the size of the frame 100 is adjusted to match the size of the intake port 10 or the exhaust port 10 of the duct connected to the air conditioner. Specifically, the size of the frame 100 may be adjusted by variably adjusting the interval between the main member 110 and the corner member 120.

Next, the frame 100 is surrounded by the air conditioner filter 300. The auxiliary air conditioner filter 400 may be coupled to the outer surface of the air conditioner filter 300.

Next, the frame 100 surrounding the intake port 10 or the exhaust port 10 of the duct connected to the air conditioner with the air conditioner filter 300 is installed.

According to the present disclosure, a filter assembly for an air conditioner according to an embodiment of the present disclosure can be adjusted in size in response to the sizes of an intake port 10 or an exhaust port 10 of a duct connected to an air conditioner, and thus can be used for general purposes in response to the size of various intake ports or exhaust ports.

Although the embodiments of the present disclosure have been described with reference to the attached drawings, those skilled in the technical field to which the present disclosure pertains will understand that the present disclosure may be practiced in other detailed forms without departing from the technical spirit or essential features of the present disclosure. Therefore, it should be understood that the above-described embodiments are exemplary in all aspects rather than being restrictive.

DESCRIPTION OF REFERENCE NUMERALS

10: INTAKE PORT, EXHAUST PORT
100: FRAME
110: MAIN MEMBER
112: INSERTION UNIT
114: GUIDE TRACK
120: CORNER MEMBER
122: GUIDE GROOVE
124: DRAW-IN AND OUT HOLE
130: AIR FLOW PORT
200: DETACHABLE UNIT
210: COUPLING HOLE
220: STOPPER
230: SCREW SHAFT
240: NUT UNIT
250: RATCHET PROTRUSION
260: SPRING
270: RATCHET GROOVE
300: AIR CONDITIONER FILTER
302: FILTERING HOLE
310: FILTER COVER
320, 330: VELCRO
400: AUXILIARY AIR CONDITIONER FILTER
402: AUXILIARY FILTERING HOLE
410: FIRST WAVE LINE
420: SECOND WAVE LINE
510: FIRST ELASTIC MEMBER
520: SECOND ELASTIC MEMBER

The invention claimed is:

1. A filter assembly for an air conditioner, the filter assembly comprising:
   a frame including a plurality of main members forming a plurality of sides and a plurality of corner members, including a corner member connecting a pair of the plurality of main members by variably adjusting an interval between the pair of the plurality of main members, wherein the frame forms an air flow port through which air passes and is detachably installable at an intake port or an exhaust port of a duct connected to the air conditioner;
   a detachable unit for detaching the plurality of main members and the plurality of corner members;
   an air conditioner filter forming a plurality of filtering holes and being stretchably provided, including a unit cross-sectional area of the plurality of filtering holes that are variable depending on variable adjustment of the frame, and filtering air passing through the air flow port; and
   an auxiliary air conditioner filter configured to be coupled to the air conditioner filter,
   wherein the auxiliary air conditioner filter includes one or more elastic members configured to stretch in longitudinal and transverse directions,
   wherein the air conditioner filter has a bag shape configured to surround and accommodate the frame, and
   wherein the one or more elastic members has a continuous concavo-convex shape.

2. The filter assembly for the air conditioner of claim 1, wherein the detachable unit comprises:
   a plurality of coupling holes formed through at least one of the pair of the plurality of main members and the corner member at intervals in a length direction; and
   a stopper selectively coupled to any one of the plurality of coupling holes to prevent the corner member from moving toward the at least one of the pair of the plurality of main members and to variably adjust an interval between the at least one of the pair of the plurality of main members and the corner member.

3. The filter assembly for the air conditioner of claim 1, wherein the detachable unit comprises:
   a screw shaft coupled to the corner member; and
   a nut unit which is screwed with the screw shaft and provided to be rotatable on at least one main member of the pair of the plurality of main members, the nut unit being configured to reciprocate the screw shaft with respect to the at least one main member according to forward and reverse rotation and to variably adjust an interval between the at least one main member and the corner member.

4. The filter assembly for the air conditioner of claim 1, wherein the detachable unit comprises:
   a ratchet protrusion provided to be drawn in and out from the corner member;
   a spring provided on the corner member to generate an elastic force on the ratchet protrusion so that the ratchet protrusion is drawn out from the corner member; and
   a plurality of ratchet grooves formed at intervals in a length direction of at least one of the plurality of main members, to which the ratchet protrusion is selectively coupled.

5. The filter assembly for the air conditioner of claim 1, wherein the auxiliary air conditioner filter is configured to stretch in response to variable adjustment of the frame between a minimum cross-sectional area of the air flow port and a maximum cross-sectional area of the air flow port, and each of the one or more elastic members forms an auxiliary filtering hole and filters air introduced into the air conditioner filter or discharged from the air conditioner filter.

6. The filter assembly for the air conditioner of claim 1, wherein the one or more elastic members are provided on a main portion of the auxiliary air conditioner filter.

7. An air conditioner comprising the filter assembly of claim 1.

8. A filter assembly for an air conditioner, the filter assembly comprising:
   a frame including a plurality of main members forming a plurality of sides and a plurality of corner members, including a corner member connecting a pair of the plurality of main members by variably adjusting an interval between the pair of the plurality of main members, wherein the frame forms an air flow port through which air passes and is detachably installable at an intake port or an exhaust port of a duct connected to the air conditioner;
   a detachable unit for detaching the pair of the plurality of main members to the corner member, the detachable unit having a ratchet protrusion provided to be drawn in and out from the corner member, a spring provided on the corner member to generate an elastic force on the ratchet protrusion so that the ratchet protrusion is drawn out from the corner member, and a plurality of ratchet grooves formed at intervals in a length direction of at least one of the pair of the plurality of main members, to which the ratchet protrusion is selectively coupled;
   an air conditioner filter forming a plurality of filtering holes and being stretchably provided, including a unit cross-sectional area of the plurality of filtering holes that are variable depending on variable adjustment of the frame, and filtering air passing through the air flow port; and
   an auxiliary air conditioner filter configured to be coupled to the air conditioner filter, wherein the auxiliary air conditioner filter includes one or more elastic members configured to stretch in longitudinal and transverse directions,
   wherein the air conditioner filter has a bag shape configured to surround and accommodate the frame, and
   wherein the one or more elastic members has a continuous concavo-convex shape.

9. The filter assembly for the air conditioner of claim 8, wherein the auxiliary air conditioner filter is configured to stretch in response to variable adjustment of the frame between a minimum cross-sectional area of the air flow port and a maximum cross-sectional area of the air flow port, and each of the one or more elastic members forms an auxiliary filtering hole and filters air introduced into the air conditioner filter or discharged from the air conditioner filter.

10. The filter assembly for the air conditioner of claim 8, wherein the one or more elastic members are provided on a main portion of the auxiliary air conditioner filter.

11. A filter assembly for an air conditioner, the filter assembly comprising:
   a frame including a plurality of main members forming a plurality of sides and a plurality of corner members, including a corner member connecting a pair of the plurality of main members by variably adjusting an interval between the pair of the plurality of main members, wherein the frame forms an air flow port through which air passes and is detachably installable at an intake port or an exhaust port of a duct connected to the air conditioner;

a detachable unit for detaching the pair of the plurality of main members to the corner member, the detachable unit having a screw shaft coupled to the corner member and a nut unit provided to be rotatable on at least one of the pair of the plurality of main members, the nut unit being configured to reciprocate the screw shaft with respect to the at least one of the pair of the plurality of main members according to forward and reverse rotation and to variably adjust an interval between the at least one of the pair of the plurality of main members and the corner member;

an air conditioner filter forming a plurality of filtering holes and being stretchably provided, including a unit cross-sectional area of the plurality of filtering holes that are variable depending on variable adjustment of the frame, and filtering air passing through the air flow port; and an auxiliary air conditioner filter configured to be coupled to the air conditioner filter, wherein the auxiliary air conditioner filter includes one or more elastic members configured to stretch in longitudinal and transverse directions, wherein the air conditioner filter has a bag shape configured to surround and accommodate the frame, wherein the one or more elastic members has a continuous concavo-convex shape.

12. The filter assembly for the air conditioner of claim 11, wherein the auxiliary air conditioner filter is configured to stretch in response to variable adjustment of the frame between a minimum cross-sectional area of the air flow port and a maximum cross-sectional area of the air flow port, and each of the one or more elastic members forms an auxiliary filtering hole and filters air introduced into the air conditioner filter or discharged from the air conditioner filter.

13. The filter assembly for the air conditioner of claim 11, wherein the one or more elastic members are provided on a main portion of the auxiliary air conditioner filter.

* * * * *